Figure 1:
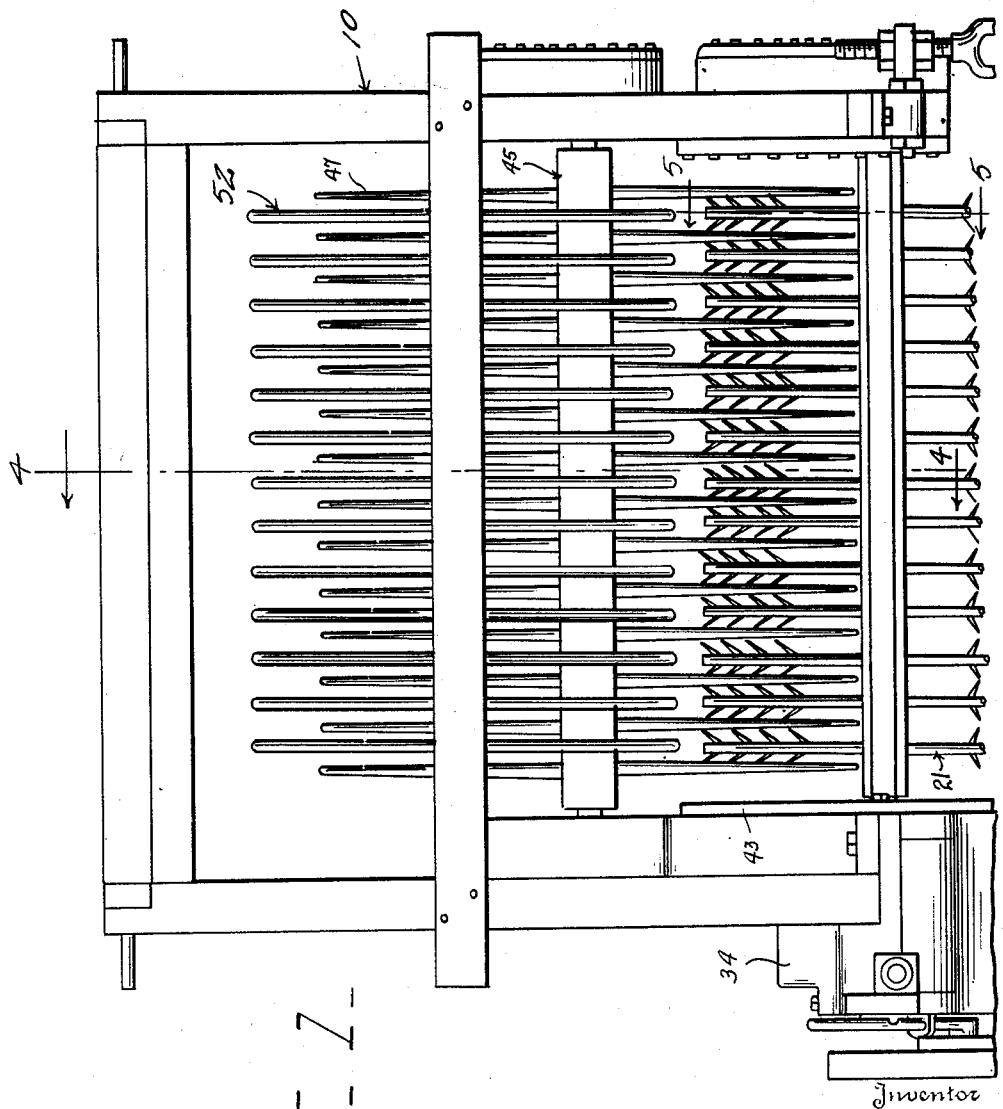

June 20, 1950  G. P. LUCIUS  2,512,109
COTTON PICKER

Filed Dec. 16, 1946  5 Sheets-Sheet 2

Inventor
GEORGE P. LUCIUS
By Kimmel & Crowell
Attorneys

INVENTOR.
GEORGE P. LUCIUS

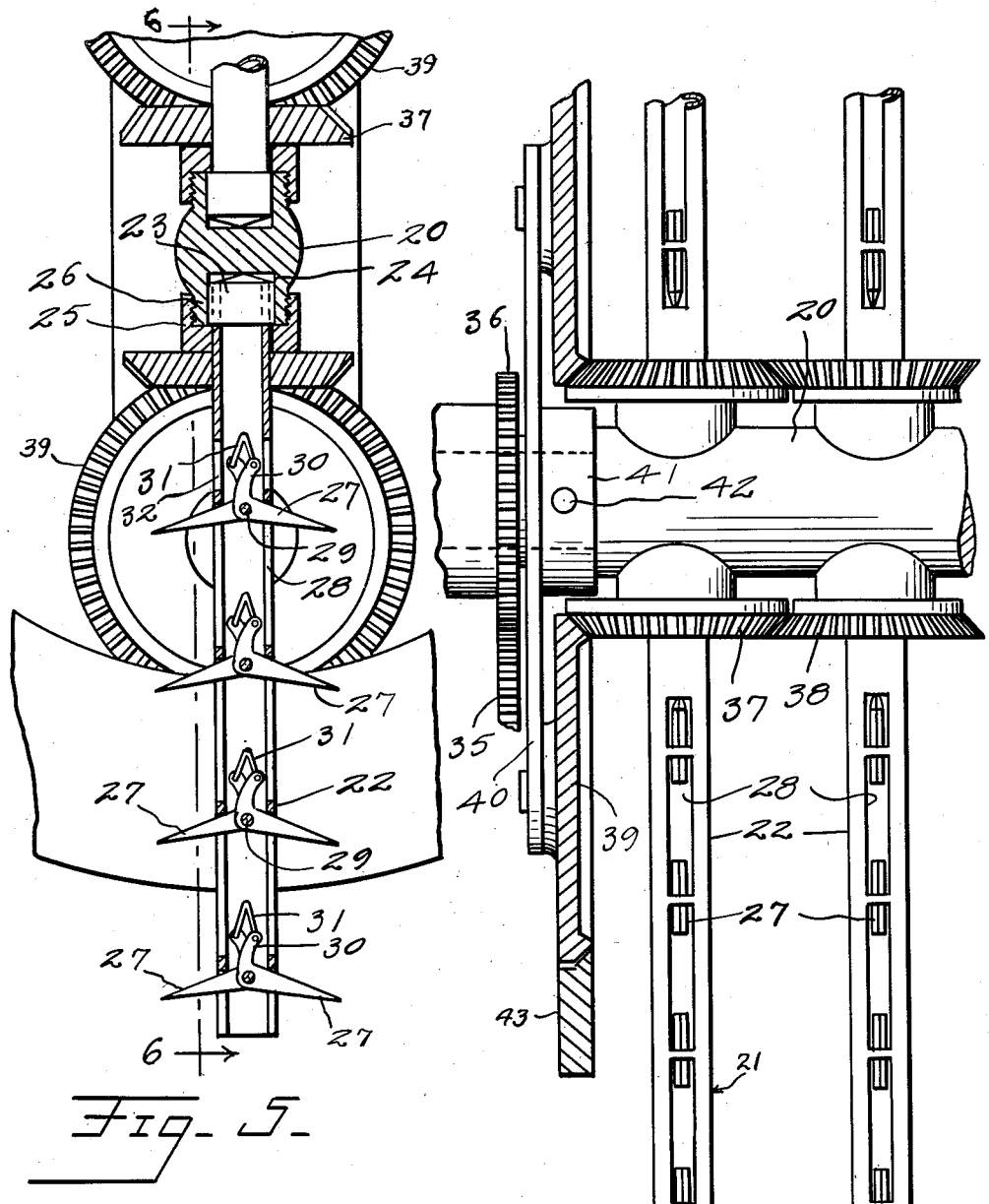

Patented June 20, 1950

2,512,109

UNITED STATES PATENT OFFICE 2,512,109

COTTON PICKER

George P. Lucius, Drew, Miss., assignor of one-fourth to J. A. Clark, one-fourth to V. R. Burnham, one-fourth to H. Lee Herring, all of Ruleville, Miss.

Application December 16, 1946, Serial No. 716,571

2 Claims. (Cl. 56—44)

1

This invention relates to cotton pickers.

An object of this invention is to provide a mechanical cotton picker which will pick the cotton bolls from the plants and will deposit the picked cotton on a conveyor extending from the rear of the machine from which the cotton may be discharged into a collector.

Another object of this invention is to provide a cotton picking machine which includes a picker reel having a plurality of radially disposed rotatable pickers mounted thereon, and each picker including a plurality of picking fingers spring mounted on the picker arms or shafts so that the cotton bolls picked by the picking fingers can be stripped therefrom by the stripping members.

Another object of this invention is to provide a cotton picker of this kind which may be designed for one or more rows of plants and may be pulled and operated by a tractor, or may be drawn by animals.

A further object of this invention is to provide a cotton picker which is of relatively simple construction so that it will withstand hard usage.

With the above and other objects in view, my invention consists in the arrangement, combination and details of construction disclosed in the drawings and specification, and then more particularly pointed out in the appended claims.

Figure 2:
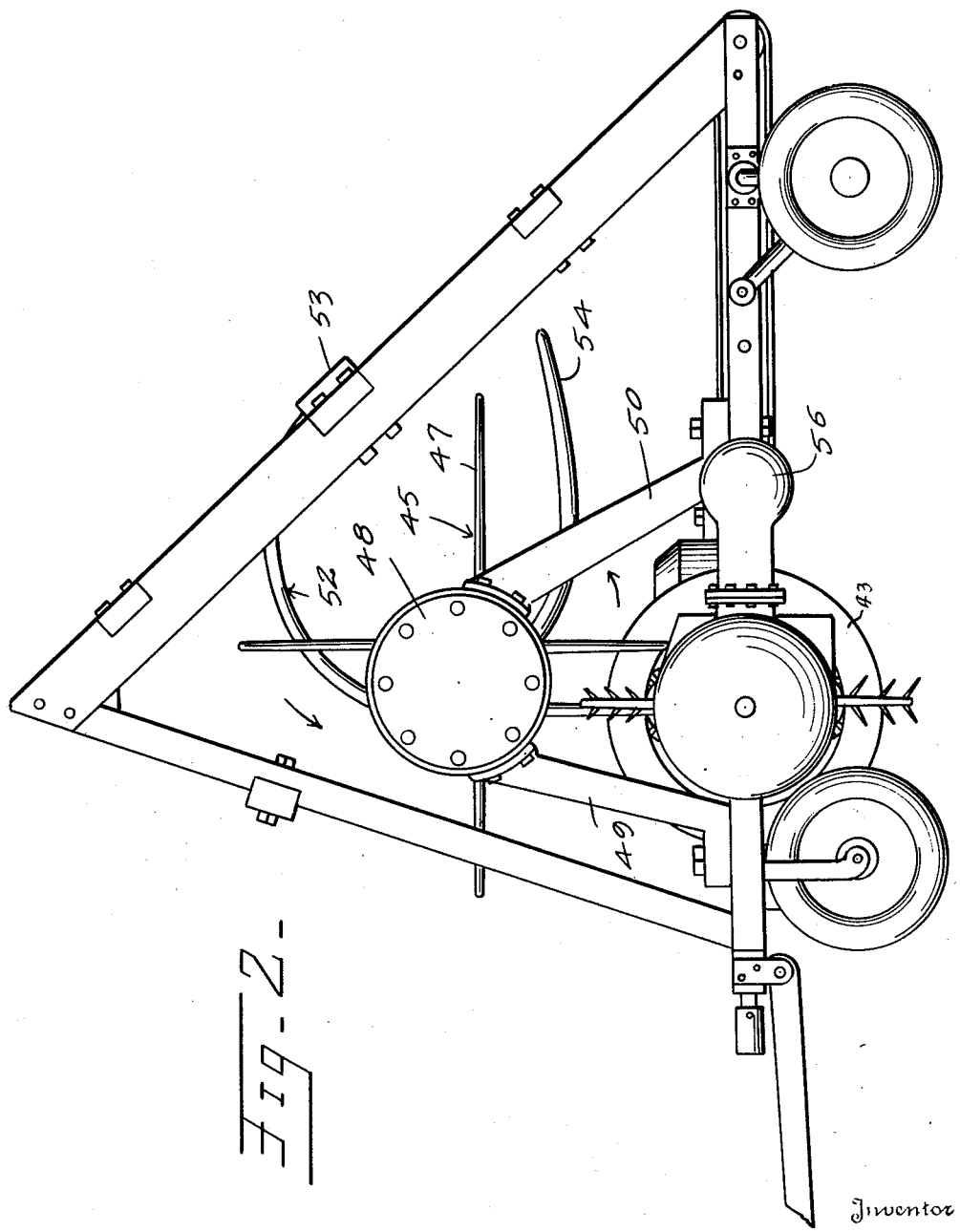
Figure 3:
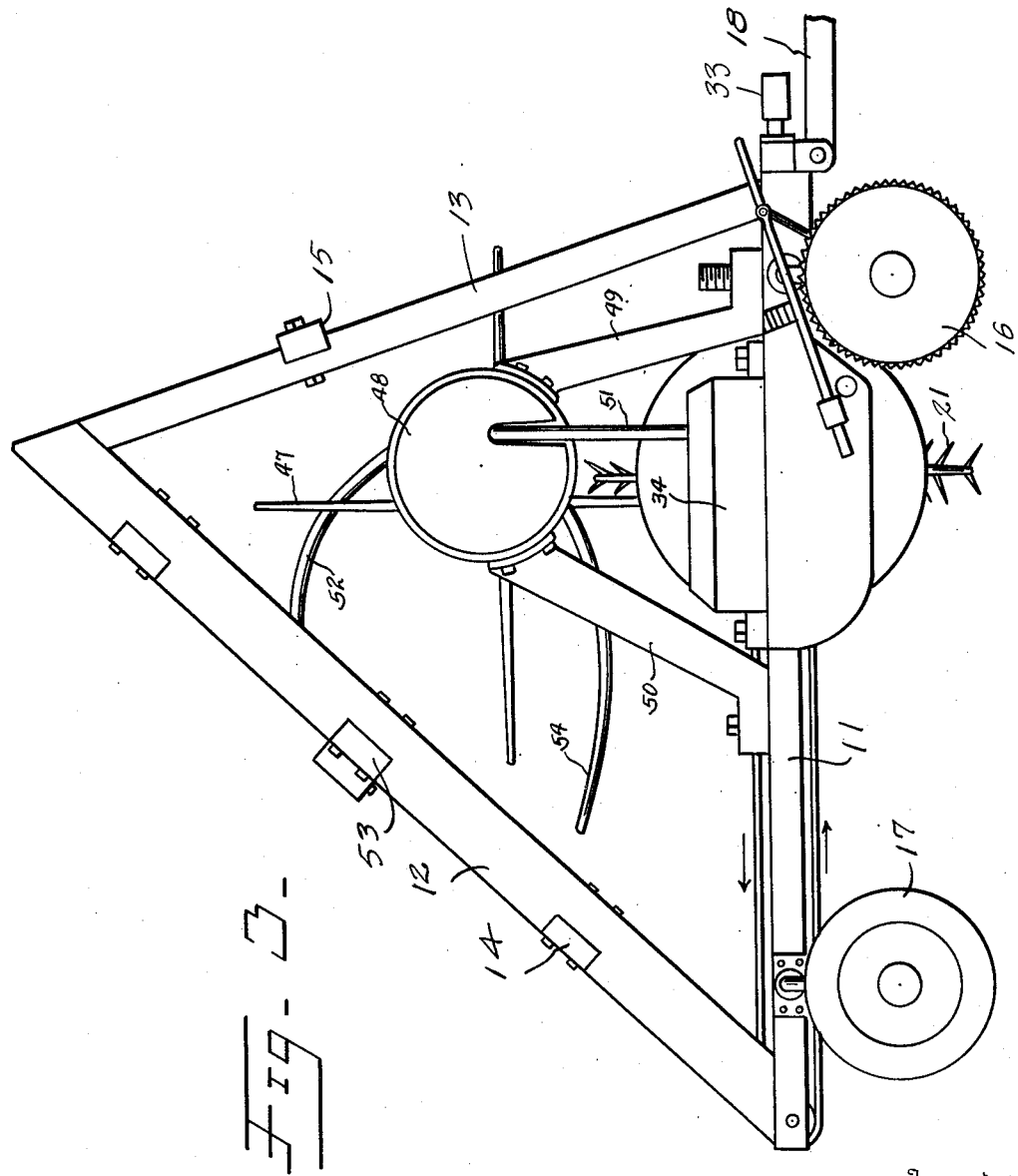
Figure 4:
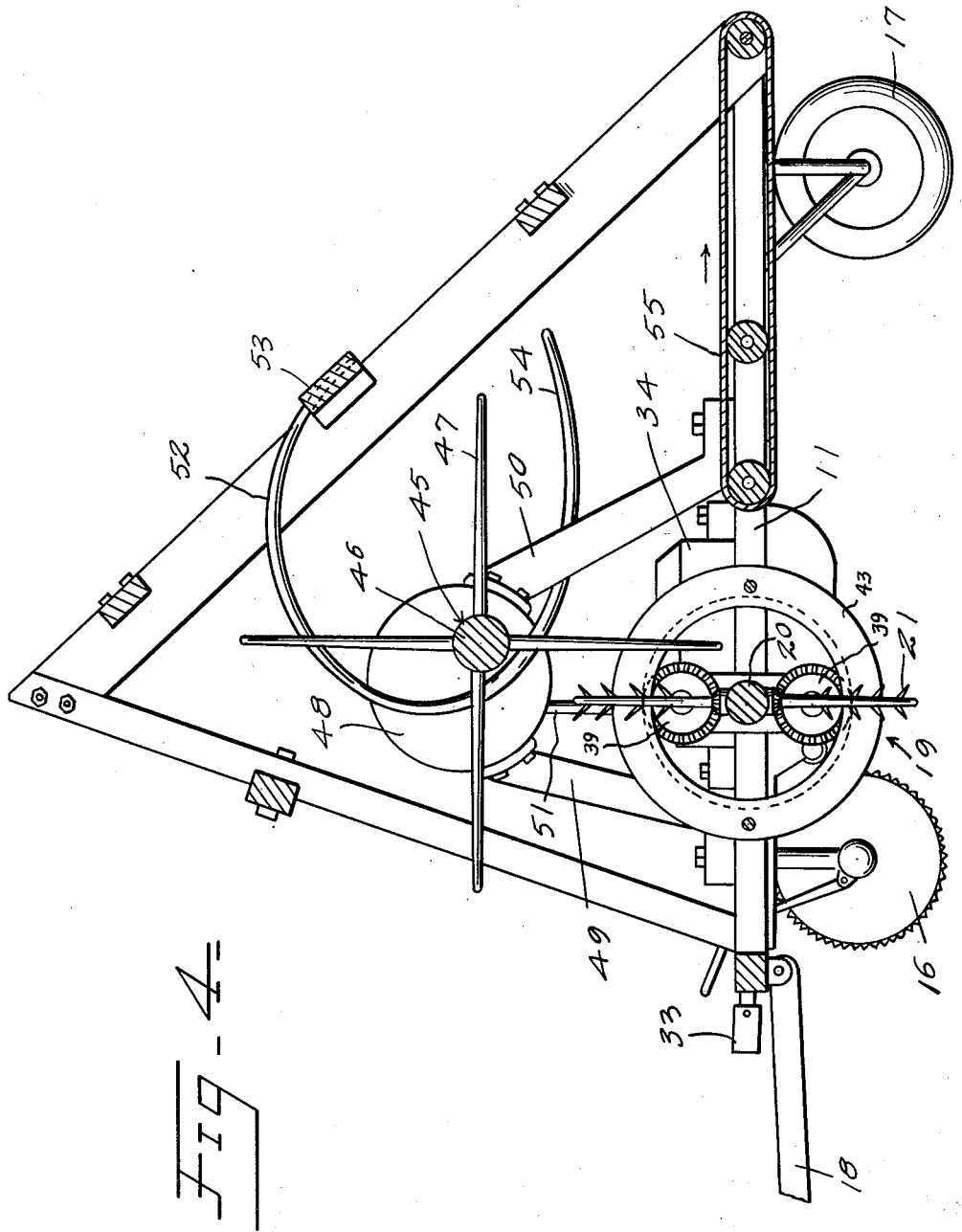

In the drawings,

Figure 1 is a detail front elevation, partly broken away, of a cotton picker constructed according to an embodiment of this invention, Figure 2 is a detail side elevation of the device, Figure 3 is a detail side elevation of the device opposite from Figure 2, Figure 4 is a sectional view taken on the line 4—4 of Figure 1, Figure 5 is a fragmentary sectional view taken on the line 5—5 of Figure 1, Figure 6 is a fragmentary sectional view taken on the line 6—6 of Figure 5.

Referring to the drawings, the numeral 10 designates generally a frame structure which is formed of opposite side members 11 and upwardly convergent frame members 12 and 13 connected together by means of connecting bars 14 and 15 respectively. The frame 10 is substantially triangular in side elevation, as shown in Figures 2, 3, and 4, and the lower frame members 11 constitute the base portion of the frame.

The frame 10 has mounted on the base frame 11 thereof wheels 16 and 17, and a drawbar 18 is connected to the front end of the frame so that the frame may be connected to a tractor or other device for pulling the frame over the ground. The frame 10 has mounted transversely therein a picker construction generally designated as 19. The picker construction 19 includes a shaft 20 which is journaled transversely across the base frame 11 and has extending radially therefrom a plurality of spindles or picker members generally designated as 21.

The picker members 21, as shown in Figure 5, are formed of elongated tubular members 22, having bosses or bushings 23 at their inner end which are mounted in sockets 24 formed in the shaft 20. The bosses or bushings 23 are rotatably held in the sockets 24 by means of caps 25 which are threaded onto the bushings 26 extending from the shaft 20.

Each picker shaft 22 has mounted thereon a plurality of lengthwise spaced apart pairs of picker fingers 27. The picker fingers 27 are of outwardly tapering construction and are loosely mounted in elongated slots 28 formed in the tubular picker shaft 22. Each pair of pickers 27 are rockably mounted on pins 29 extending diametrically across the picker shaft 22, and each picker fingers 27 includes an angularly disposed arm 30 which is normally positioned within the interior of the hollow picker shaft 20.

A spring 31 connects the two members of each pair of picker fingers 27 so as to constantly urge these picker fingers to outwardly extended position which is the operative position of these picker fingers, as shown in Figure 5. The tubular shaft 20 is also formed with slots 32 within which the arms 30 are adapted to engage when the pickers are swung inwardly with respect to the slots 28.

As shown in Figure 4, there are two series of picker members mounted on the shaft 20 in opposed relation, but it will be understood that as many of these picker members as may be desired may be mounted on the shaft 20. The shaft 20 is adapted to be rotated by means of a drive shaft 33 which extends from the forward end of the frame 10 and is adapted to be coupled to the power take-off of the tractor or other suitable power means. The shaft 33 at its inner or rear end is connected to a transmission 34 of conventional construction, mounted on the base frame 11 and the transmission 34 includes gear means coupled to the shaft 20 for rotation of the latter. This gear means may include a gear 35 forming part of the transmission and a gear 36 which is fixed on the shaft 20.

In order to provide for rotation of the hollow picker shaft 22 as they swing with rotation of the shaft 20, each picker shaft 22 has mounted on the inner end thereof a beveled gear 37. The several picker shafts 22 which are disposed in parallel relation on the shaft 20 are gear coupled together by means of gears 37 and 38. The outermost ones of the gears 37 are engaged with beveled gears 39 carried by a gear carrier 40 which is formed with a hub 41 fixed by fastening means 42 to the shaft 20. There are two of these gears 39, one for each series of picker members and the gears 39 are adapted to mesh with a stationary ring gear 43 which is fixed by fastening means 44 to the inner portion of the base frame 11, as shown in Figure 4.

In order to provide for removal of the cotton bolls which are removed from the plants by the picker fingers or members 27, I have provided a rotary stripper or doffing means generally designated as 45. The stripper 45 includes a shaft 46 having fixed thereto a plurality of stripper rods or bars 47. The stripper rods or bars 47 are adapted to engage between pairs of picker shaft 22, as shown in Figure 1 so that when the picker shafts 22 engage between the stripper members 47, the spring-pressed fingers 27 will have the cotton bolls engaged with the fingers removed and these cotton bolls will then be moved rearwardly by rotation of the stripper member 45.

The stripper member 45 is rotated by means of a transmission or gear assembly 48 supported by supporting members 49 and 50, and the transmission 48 is operatively connected to the transmission 34 by means of a shaft 51. The cotton bolls which are engaged with the stripper rods 47 are removed therefrom by means of a plurality of stationary stripper rods 52 which are fixed to a supporting bar 53 extending transversely between the sides of the frame. The stationary stripper members 52 are of substantially C-shape in side elevation and extend forwardly from an upper position above the shaft 45, over the forward side of this shaft, and then beneath the shaft 45, terminating in free ends 54 which are adapted to overlie the inner end of a rearwardly moving conveyor 55.

The conveyor 55 is disposed between the side members 11 of the frame and is operatively connected with the transmission 34 through a conveyor transmission 56. The upper run of the conveyor 55 moves rearwardly so that the cotton dropping thereon will be moved to the rear of the machine and a suitable receiver or collector may be attached or coupled with the rear of the device for collecting the cotton bolls as they are discharged from the rear end of the conveyor 55.

In the use and operation of this device, the frame 10 is attached as an example, to the rear of a tractor, with the shaft 33 connected to the power take-off or other suitable power means. The device is then moved along a row of cotton plants and as the shaft 20 rotates, picker shafts 22 will rotate as they swing with the rotation of shaft 20. The picker fingers 27 will be normally in their extended position, as shown in Figure 5, during the lower half of the swinging of the picker shafts 22 so that the cotton bolls will be wound partly about the picker shafts and engaged with the picker fingers 27. When the picker shafts 22 are in the upper half of each cycle of rotation they will engage between pairs of stripper rods or bars 47 rotated with the rotation of the shaft 46. The rods 47 are spaced apart a distance sufficient to provide for contracting the picker fingers within the picker shafts 22, and as the fingers 27 are rocked inwardly toward the shaft 22, the cotton on these fingers which taper outwardly with the smaller ends outermost will be stripped therefrom and moved rearwardly and upwardly. The stationary strippers 52 will remove the cotton from the rotary stripper bars 47 and the cotton removed by the stationary stripper bars 52 will be dropped onto the rearwardly moving upper run of the conveyor 55.

I do not mean to confine myself to the exact details of construction herein disclosed, but claim all variations falling within the purview of the appended claims.

What I claim is:

1. In a cotton picker mounted on a mobile frame, a transversely mounted rotatable shaft carried by the frame, rotary picker means mounted on said rotatable shaft and having operative association with the rods of a rotary doffing means mounted adjacent thereto for sliding engagement therewith, said picker means including a plurality of radially disposed spindle members mounted for rotation relative to and with said transversely mounted shaft, gear means associated with the shaft for rotation of the spindles on rotation of said shaft, a plurality of pairs of rockably mounted picker fingers, each of said pairs being mounted on pin means carried by the spindles and spaced longitudinally thereof with said fingers of each pair normally spaced apart, and spring means carried by each pair of fingers urging the fingers outwardly with said fingers being movable toward each other on engagement with the rotary doffing means.

2. In a cotton picker mounted on a mobile frame, a transversely mounted rotatable shaft carried by the frame, rotary picker means mounted on said rotatable shaft and having operative association with the rods of a rotary doffing means mounted adjacent thereto for sliding engagement therewith, said picker means including a plurality of radially disposed spindle members mounted for rotation relative to and with said transversely mounted shaft, said spindles being comprised of radially disposed tubular members having a plurality of oppositely opening slots spaced longitudinally of said tubular members, gear means associated with the shaft for rotation of the spindles on rotation of said shaft, a plurality of pairs of rockably mounted picker fingers, each of said pairs being mounted on pin means carried by the spindles with said fingers of each pair normally spaced apart, and spring means carried by each pair of fingers urging the fingers outwardly with said fingers being movable toward each other on engagement with the rotary doffing means.

GEORGE P. LUCIUS.

REFERENCES CITED

The following references are of record in the file of this patent:

UNITED STATES PATENTS

| Number | Name | Date |
| --- | --- | --- |
| 458,751 | Dooley | Sept. 1, 1891 |
| 993,147 | Briggs | May 23, 1911 |
| 1,078,327 | Appleby | Nov. 11, 1913 |
| 1,208,591 | Lovejoy | Dec. 12, 1916 |
| 1,525,670 | So Relle | Feb. 10, 1925 |
| 1,745,925 | Goodwin | Feb. 4, 1930 |
| 1,959,070 | Thomann | May 15, 1934 |